United States Patent [19]

Johnson et al.

[11] Patent Number: 4,624,597
[45] Date of Patent: Nov. 25, 1986

[54] FLANGED BUSHING MOUNTING ADAPTOR

[75] Inventors: James D. Johnson, Greer; Terrence A. Kamp, Simpsonville, both of S.C.

[73] Assignee: Reliance Electric Company, Greenville, S.C.

[21] Appl. No.: 643,847

[22] Filed: Aug. 23, 1984

[51] Int. Cl.$^4$ .................. B25G 3/00; E21B 19/16; F16D 1/00
[52] U.S. Cl. ............................ 403/16; 403/370; 403/374; 403/355
[58] Field of Search ............... 403/368, 370, 371, 374, 403/365, 355, 16, 259, 356; 474/902, 903

[56] References Cited

U.S. PATENT DOCUMENTS

| | | | |
|---|---|---|---|
| 2,402,743 | 6/1946 | Firth | 403/16 |
| 2,556,151 | 6/1951 | Bremer | 403/370 X |
| 3,682,505 | 8/1972 | Firth | 403/370 |
| 3,851,977 | 12/1974 | Boole | 403/370 X |
| 3,957,381 | 5/1976 | Schäfer | 403/374 X |
| 4,025,213 | 5/1977 | Schäfer et al. | 403/370 X |
| 4,268,185 | 5/1981 | Mullenberg | 403/370 X |
| 4,304,502 | 12/1981 | Stratieko | 403/370 |
| 4,348,132 | 9/1982 | Mullenberg | 403/371 X |
| 4,354,769 | 10/1982 | Peter | 403/370 X |
| 4,433,877 | 2/1984 | Colanzi | 403/259 X |
| 4,512,681 | 4/1985 | Hayhurst et al. | 403/371 |

FOREIGN PATENT DOCUMENTS

| | | |
|---|---|---|
| 1405715 | 9/1975 | United Kingdom . |
| 1476030 | 6/1977 | United Kingdom . |
| 1527956 | 10/1978 | United Kingdom . |
| 2026650 | 2/1980 | United Kingdom . |

OTHER PUBLICATIONS

Dodge Catalog D-78, p. 20-9.

Primary Examiner—Cornelius J. Husar
Assistant Examiner—Todd G. Williams
Attorney, Agent, or Firm—Dority & Manning

[57] ABSTRACT

A flanged bushing mounting adaptor for use in mounting a flanged bushing in the hub of a shaft-mountable structure, the hub having a tapered bore with recesses formed therein, and the bushing having a tapered barrel and a flange with threaded and unthreaded holes therein. The adaptor has a tapered outer circumferential surface for wedging engagement with the oppositely tapered hub, and a tapered bore for wedging engagement with the oppositely tapered barrel of the bushing. The adaptor also includes a plurality of threaded bores corresponding to the unthreaded holes in the flange, for receiving screws or bolts to secure the bushing to the adaptor and to draw the assembly into the hub. Bosses, or recesses with set screws, corresponding to the recesses in the hub, may be included on or in the outer surface of the adaptor to prevent relative rotation between the adaptor and the hub.

12 Claims, 16 Drawing Figures

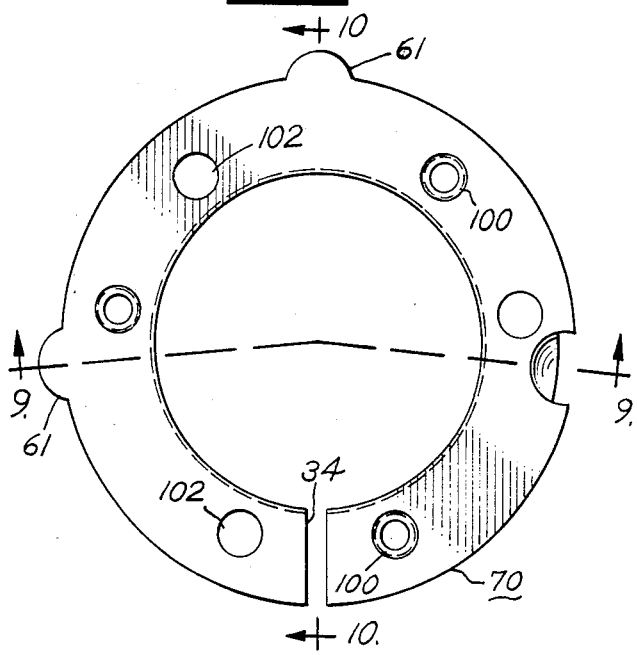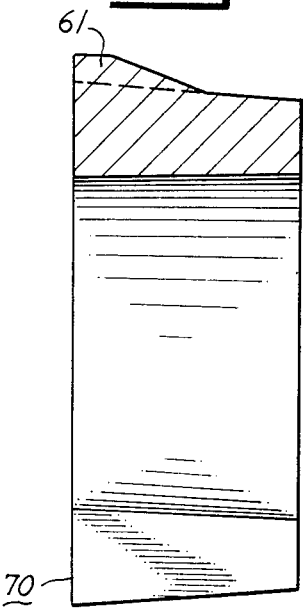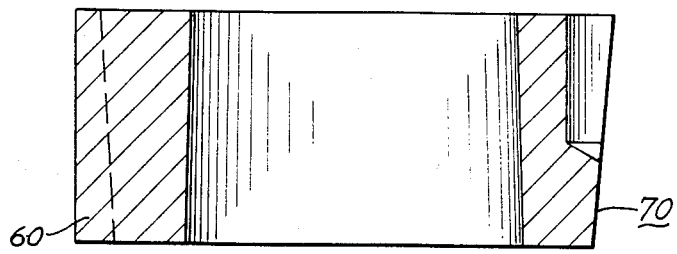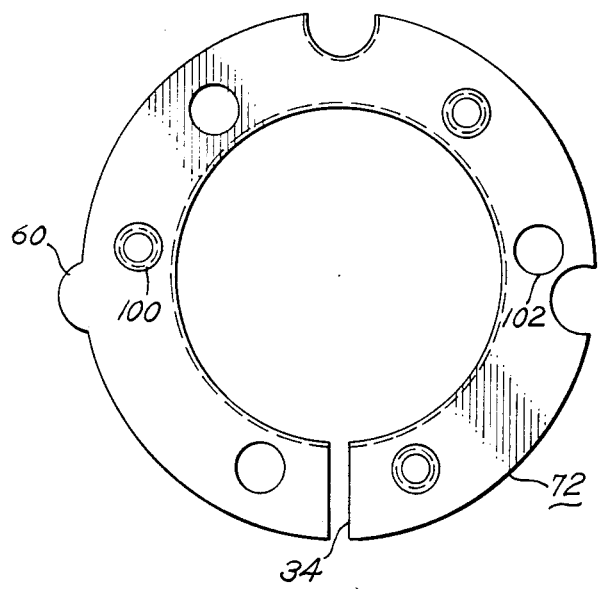

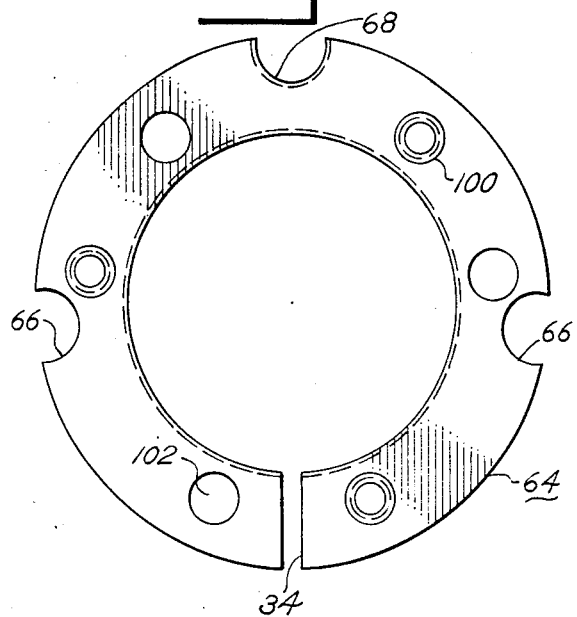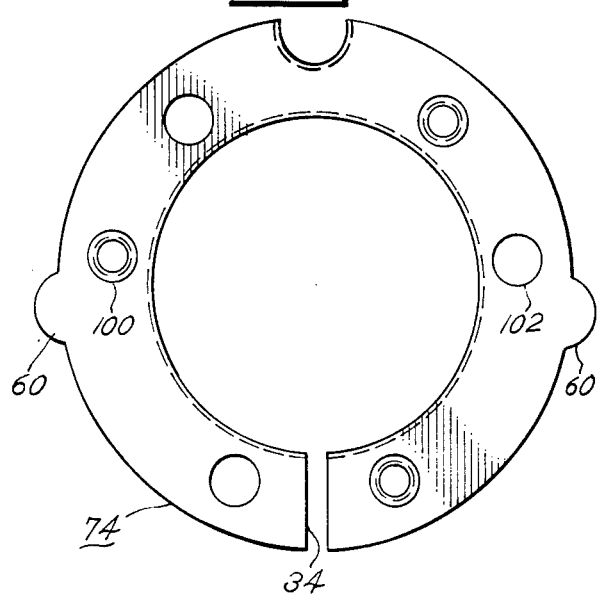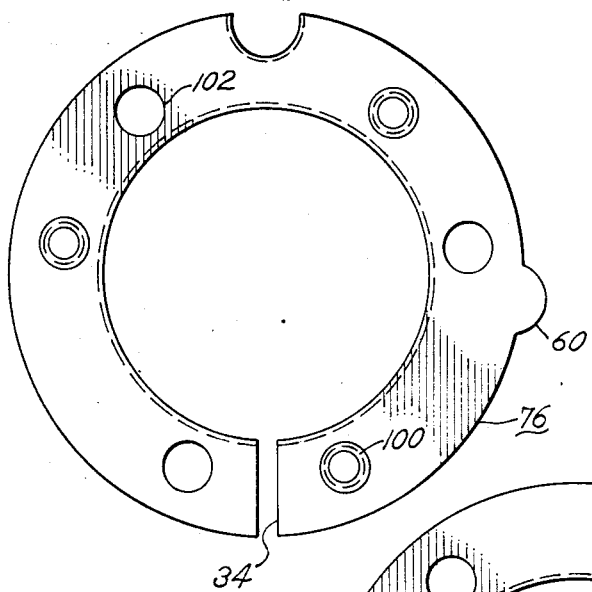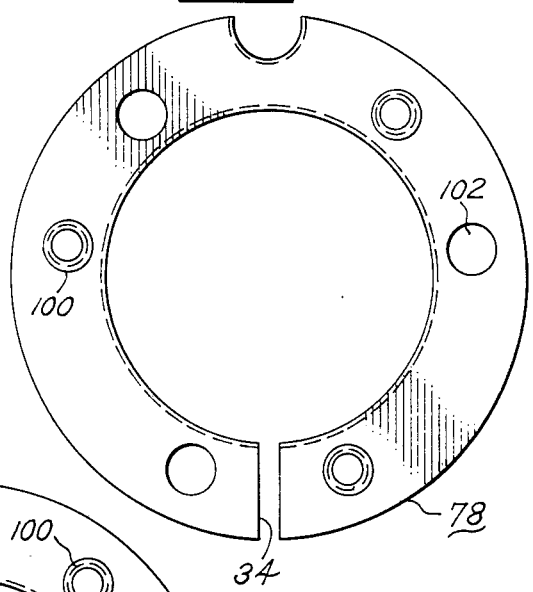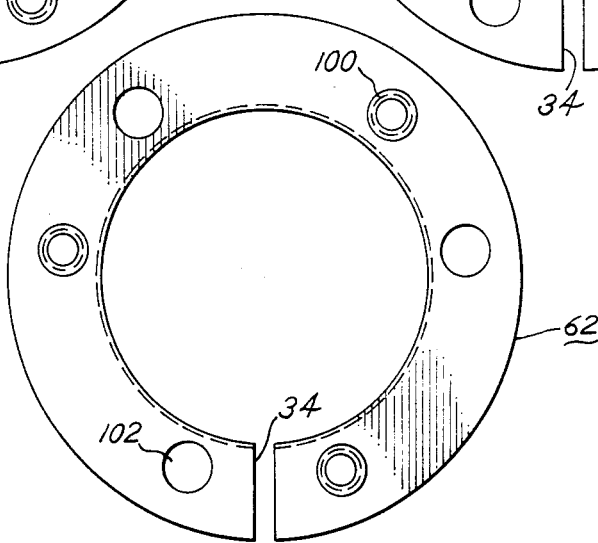

FLANGED BUSHING MOUNTING ADAPTOR

BACKGROUND OF THE INVENTION

Shaft mounted structures, such as sheaves, gears, couplings, and the like, normally have one of two basic types of hubs for securing the structure to the shaft. The hub may be either bored-to-size, or drilled to the approximate size of the shaft and secured with a key, or the hub may have a tapered bore for accepting an oppositely tapered bushing, resulting in a wedged fit of the bushing and hub. The tapered hubs may include threaded and unthreaded half-holes or recesses formed in the inner wall thereof which correspond to unthreaded and threaded half-holes, respectively, formed in the outer wall of the bushing for accepting securing means, such as set screws. This application is concerned with the latter type, that is, shaft mounted structures having hubs with tapered bores. For tapered hubs, one of two general types of tapered bushing is normally used to secure the particular structure to the shaft. The tapered bushing may be a flush-mounted type with set screws as a securing means, normally used in installations where available space is limited, or where two structures, such as a sheave and a gear sprocket, must be mounted adjacent one another, or it may be a flanged bushing, having an annular, radially extending flange surrounding the large end of the body of the bushing.

Both types of bushings are of the split, contractible type, and, as the securing bolts are tightened and the oppositely tapered surfaces are drawn together, the bushing contracts around and securely grips the shaft. While some characteristics are shared by the two tapered bushing types, they are not designed to be interchangeable. This is mainly due to the different methods used to secure the bushings to the shafts. The flush-mounted type has unthreaded half-holes around the outer surface which correspond to threaded half-holes around the inner surface of the hub. As the set screws inserted therein are tightened, pressure against a shoulder of the unthreaded bushing half-holes forces the tapered surfaces to wedge together and forces the bushing to contract around and grip the shaft. To remove such bushings, a threaded half-hole is provided in the bushing which corresponds to an unthreaded half-hole in the hub. As a set screw is inserted therein and tightened, the bushing is forced outwardly by the pressure of the set screw against a shoulder of the half-hole in the hub, thereby disengaging its grip on the shaft and permitting its removal. In the flanged bushings, threaded and unthreaded holes are provided in the flange. Headed bolts or screws are inserted through the unthreaded holes in the flange and threaded into corresponding threaded holes in the hub to force the tapered surfaces together and mount the bushing. For removal, the bolts are threaded through the threaded holes in the flange and against a solid portion of the hub to force the tapered surfaces apart.

Thus, it can easily be seen that the two tapered bushing types are not interchangeable. If, for example, a flush-mounted bushing is required to replace a flanged bushing because of a reduction in available space caused by, say, the addition of another structure to the shaft, the structure itself must be changed along with the bushing, since the hubs are designed to accept one or the other type of bushing only. Therefore, both types of bushings, as well as shaft-mounted structures which will accept one or the other type, must be stocked or otherwise made available to meet varying demands.

SUMMARY OF THE INVENTION

It is, therefore, one of the principal objects of the present invention to obviate the need to change the shaft mounted structure to accommodate the type of bushing to be used to secure the structure to the shaft by providing a flanged bushing mounting adaptor, which is accepted by the hub in place of the flush-mounted bushing, and which, in turn, accepts a flanged bushing for securing the structure to the shaft.

Another object of the present invention is to permit the reduction of inventoried shaft-mounted structures, hubs, bushings, and various adaptors, that are differentiated only by mounting type, by providing a flanged bushing mounting adaptor that mounts flush in a tapered hub and accepts a plurality of flanged-bushing types.

A further object of the present invention is to provide a flanged bushing mounting adaptor that is easily and securely mounted in a tapered hub, requiring no special tools or special training for the installers.

A still further object of the present invention is to provide a flanged bushing mounting adaptor which is durable and reusable, and which simplifies the process of mounting and securing structures, such as pulleys, to shafts for rotation therewith.

These and other objects are attained by the present invention, which relates to a flanged bushing mounting adaptor for use in mounting a flanged bushing in the hub of a shaft mounted structure, the bushing having a tapered barrel and a radially extending flange with a plurality of threaded and unthreaded holes therein, and the hub having a tapered bore with recesses formed therein. The adaptor comprises a split annular member having a tapered outer circumferential surface for engaging the oppositely tapered hub bore, and a tapered central bore for receiving the oppositely tapered barrel of the bushing. A plurality of threaded axial bores are formed in the annular member, and suitable fastening means are disposed through the unthreaded holes in the flange and threaded into the threaded bores in the annular member for securing the member and bushing together in the hub. In one embodiment, protrusion means extend outwardly from the outer circumferential surface of the adaptor for engaging the recesses in the hub bore and positively preventing relative rotation therebetween. In another embodiment, recesses are formed in the outer circumferential surface of the adaptors, which correspond to the recesses formed in the hub bore and accept suitable fastening means in the holes thus formed to secure the adaptor in the hub. Various combinations of protrusion means and/or recesses with fastening means may be used to secure the adaptor against rotation relative to the hub, or the adaptor may depend on the wedged fit to prevent rotation. The securing means may be inserted from either side, first through an unthreaded hole in the flange or adaptor, and then into the threaded bores of the adaptor, where tightening forces the tapered surfaces into wedging engagement. To remove the bushing, the securing means are removed and inserted into threaded bores in the flange or the adaptor to abut a solid portion of the adaptor or flange, respectively, where tightening forces the bushing out of the adaptor.

Various other objects and advantages of the present invention will become apparent from the following

BRIEF DESCRIPTION OF THE DRAWINGS

FIG. 8 is a front elevational view of a modified form of the present mounting adaptor;

FIG. 9 is a cross-sectional view of the adaptor shown in the preceding figure, the section being taken on line 9—9 of FIG. 8;

FIG. 10 is another cross-sectional view of the adaptor shown in FIG. 8, the section being taken on line 10—10 of FIG. 8;

FIG. 11 is a front elevational view of a modified form of the present mounting adaptor; and FIGS. 12 through 16 are front elevational views of modified forms of the present mounting adaptor.

DETAILED DESCRIPTION OF THE PREFERRED EMBODIMENT

Figure 1:
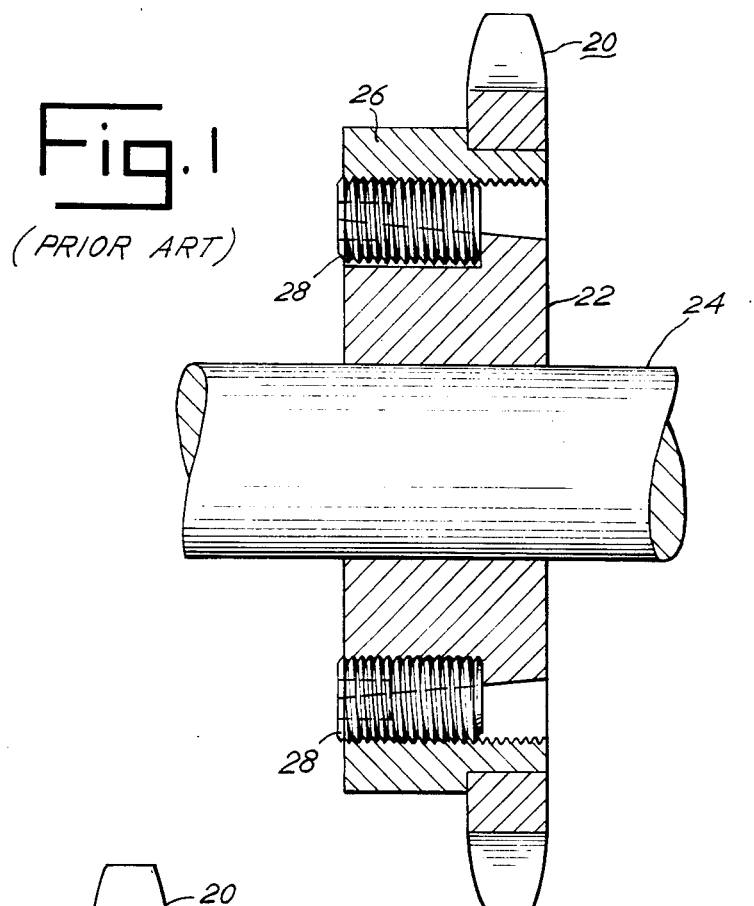
FIG. 1 is a cross-sectional view of a prior art embodiment of a flush-mounted tapered bushing used to secure a sprocket with a tapered hub to a shaft, the shaft being shown in elevation.

Referring more specifically to the drawings, and to FIG. 1 in particular, numeral 20 designates generally a sprocket, illustrating a type of shaft-mountable structure with which the flanged bushing mounting adaptor embodying the present invention may be used. FIG. 1 is an illustration of the prior art in this field, with a flush-mounted, split, tapered bushing 22, such as that sold under the trademark "Taper-Lock" by Reliance Electric Company, mounted on a shaft 24 in the hub portion 26 of sprocket 20, to secure the sprocket to the shaft for rotation therewith. The bushing 22 has a tapered outer circumferential surface which corresponds to an oppositely tapered inner circumferential surface in the hub of the structure to be mounted on the shaft, resulting in a secure, wedged fit of the bushing in the hub. The bushing has threaded and unthreaded half-holes formed in the outer wall thereof which correspond to unthreaded and threaded half-holes, respectively, formed in the inner wall of the hub. To install the bushing, set screws 28 are threaded into the holes formed with the threads in the hub and tightened, thereby forcing the tapered surfaces together and forcing the bushing to contract around and securely grip the shaft. To remove the bushing, the set screws 28 are removed, and one or more set screws are threaded into the holes having the threaded portion in the bushing wall. The unthreaded half-hole in the interior wall of the hub has a shoulder against which the set screw may push to effect de-wedging of the bushing and hub. This design has proved very efficient in securing structures to shafts, and the set screws, in addition to their function in installing and removing the bushing, also function as keys for further security in preventing relative rotation between the bushing and the mounted structure.

As previously discussed, hub 26 of sprocket 20 will not normally accept a flanged, split, tapered bushing, and if a flanged bushing is either desired or required for a particular installation, the sprocket or other structure must be changed to a type which will accommodate the flanged bushing. The present invention obviates this requirement by providing a flanged bushing mounting adaptor, designated generally by numeral 30 in FIG. 2. The present adaptor has been designed to mount flush within a tapered hub, such as hub 26 of sprocket 20, and to accept a flanged tapered bushing 32 for securing the sprocket to the shaft.

The adaptor has an annular, split sleeve configuration with a slit 34 that extends axially and radially through the wall of the adaptor, thus permitting contraction of the adaptor as it is inserted into the hub, and expansion of the adaptor around the body 36 of the flanged bushing as the bushing is inserted therein. The outer circumferential surface 38 of the adaptor is tapered with the same taper as the outer surface of the flush-mounted bushing 22, and the inner circumferential surface 40 of the adaptor is tapered in the opposite direction to wedgingly accept the tapered body 36 of the flanged bushing 32. Thus, as shown in FIGS. 1 and 2, the same sprocket 20 can be mounted on the shaft 24 with the flush-mounted bushing 22, or with the flanged bushing 32, in combination with the present adaptor 30, thereby eliminating the need to change the sprocket to accommodate the flanged bushing.

Figure 2:
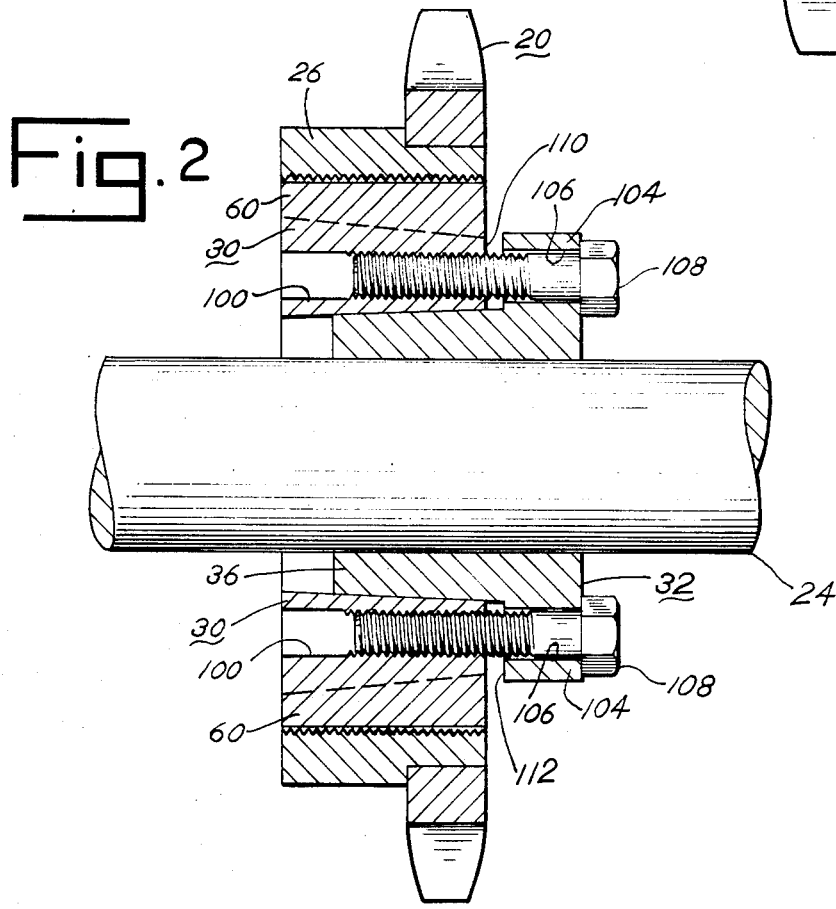
FIG. 2 is a cross-sectional view, similar to that of FIG. 1, of the flanged bushing mounting adaptor embodying the present invention, shown here mounted in the hub of a sprocket and accepting a flanged bushing.
Figure 5:
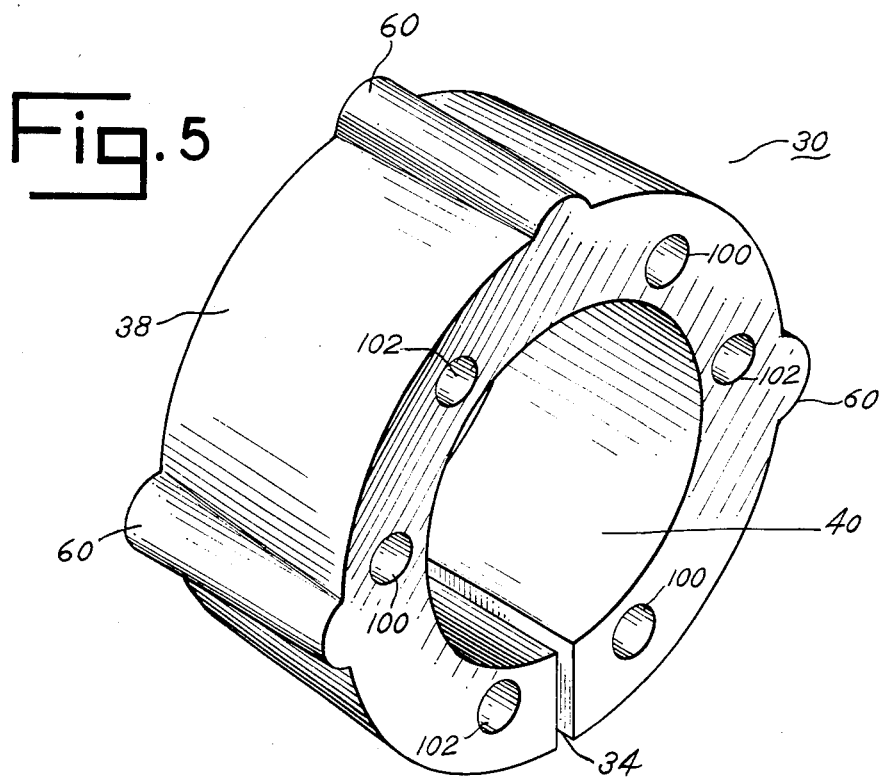
FIG. 5 is a perspective view of one form of the mounting adaptor for a flanged bushing embodying the present invention.
Figure 6:
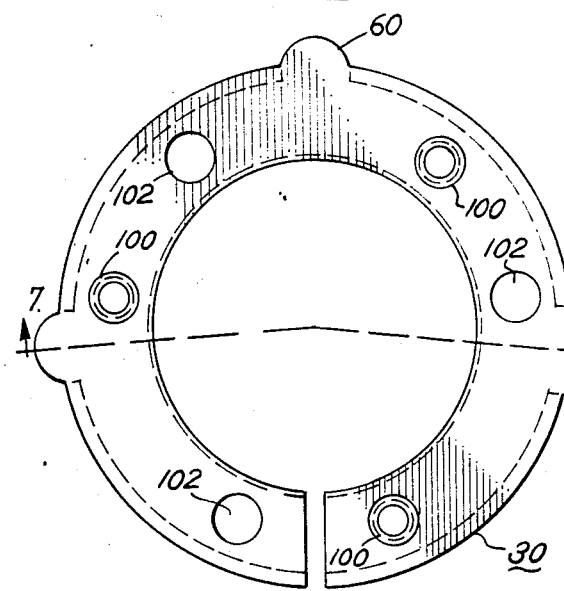
FIG. 6 is a front elevational view of the mounting adaptor shown in the preceding figure.
Figure 7:
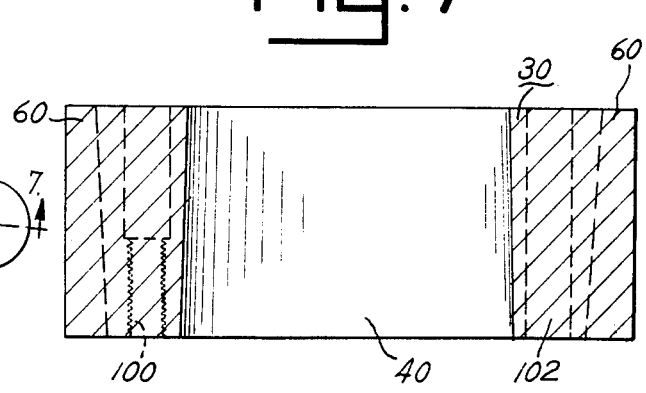
FIG. 7 is cross-sectional view of the adaptor shown in the preceding figure, the section being taken on line 7—7 of FIG. 6.

The adaptor is installed by pressing or tapping it into the tapered hub, effecting a wedging between the oppositely tapered walls of the hub and adaptor, as shown in FIG. 2. The adaptor may include means protruding from the outer circumferential surface 38, such as bosses 60, which are designed to fit into the half-holes in the hub that normally receive the set screws 28 used for securing the flush-mounted bushing 22. The bosses serve as a means for correctly aligning the adaptor during its installation into the hub, and also function as keys during operation, thereby insuring against slippage between the hub and the adaptor. The outer surface of the adaptor may also have no bosses, as shown by adaptor 62 in FIG. 16, and depend on the wedged fit to guard against slippage, or it may have any number, depending on the particular hub; however, in general, there will be three bosses, corresponding to the normal number of half-holes in a standard tapered hub. The principle may also, of course, be expanded to cover larger hubs, for example, which may have more than three half-holes, by providing a corresponding boss on the outer circumferential surface of the adaptor. Similarly, the bosses may extend along the entire axial length of the adaptor, as shown by bosses 60 in FIG. 5, or they may extend along only part of the axial length, as shown by boss 61 in FIGS. 8 and 10.

The adaptor may also be mounted using the same method and set screws used to install the flush-mounted bushing 22, as described hereinabove. For example, adaptor 64 in FIG. 12 has recesses formed in its outer surface, such as a pair of unthreaded half-holes 66 which correspond to the threaded half-holes in the hub for receiving set screws for mounting the adaptor, and a threaded half-hole 68 which corresponds to an unthreaded half-hole in the hub for removing the adaptor. In addition, various combinations of bosses and/or half-holes may be used, as shown by adaptor 70 in FIGS. 8 through 10; adaptor 72 in FIG. 11; adaptor 74 in FIG. 13; adaptor 76 in FIG. 14; and adaptor 78 in FIG. 15. Where the present adaptor is mounted using set screws in the corresponding half-holes, the set screws also function as keys, to prevent relative rotation between the adaptor and hub.

In all the embodiments shown, the adaptors have six axially disposed bores formed in the wall thereof, bores 100 being partially threaded, and bores 102 being unthreaded and alternating in application with the threaded bores. The flanged bushing 32 also has six axially disposed holes formed in the flange 104, with three of the holes 106 being unthreaded, and the other three (not shown) being threaded and alternating in application with the unthreaded holes 106. As shown in FIG. 2, the adaptor 30 is inserted from one side of the hub, here, the left side, and the flanged bushing is inserted from the opposite side. To secure the flanged bushing, suitable securing means, such as bolts or screws 108, are inserted through the unthreaded holes 106 in the flange 104 and threaded into the threaded bores 100 in the adaptor. As the screws are tightened, the adaptor is expanded around the body 36 of the flanged bushing, and the flanged bushing is drawn into the adaptor, causing the bushing to contract around and securely grip the shaft. The screws may also be inserted from the opposite side from that shown in FIG. 2 where dictated by spatial limitations, the screws being inserted through the unthreaded bores 102 in the adaptor and threaded into the threaded bores (not shown) in the flange, whereupon the adaptor and bushing are drawn together in the hub as the screws are tightened.

To remove the flanged bushing from its mounted position, the screws 108 are first removed and then threaded through the threaded holes (not shown) in the flange to abut a solid face portion 110 of the adaptor between the axial bores. Tightening of the screws against the face portion 110 forces the flanged bushing out of the adaptor. The bushing may also be removed from the opposite side. Screws 108 are first removed and then threaded through the threaded bores 100 of the adaptor to abut a solid face portion 112 of the flange between the axial holes. Tightening of the screws against the flange forces the flanged bushing out of the adaptor.

Figure 3:
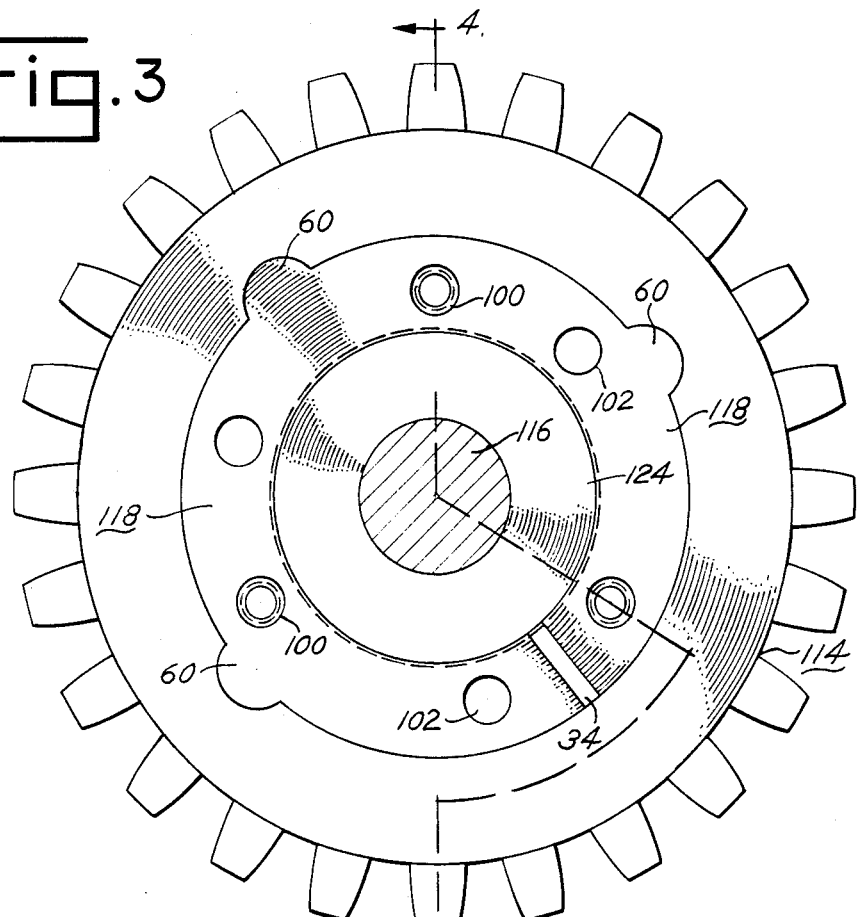
FIG. 3 is a front elevational view of the present flanged bushing mounting adaptor, shown here used in combination with the flanged bushing for securing the sprocket to the shaft.
Figure 4:
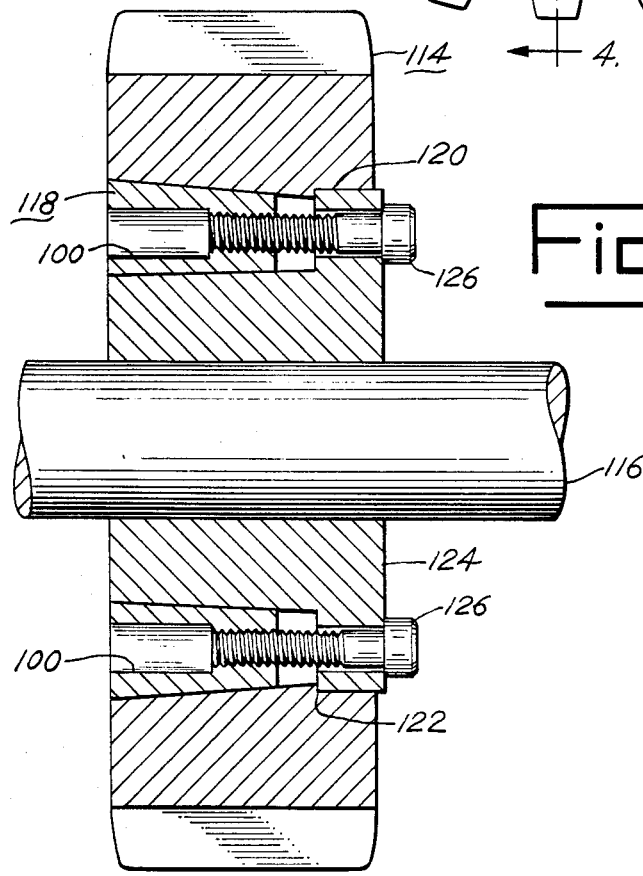
FIG. 4 is a cross-sectional view of the mounted adaptor, bushing, and sprocket, the section being taken on line 4—4 of FIG. 3.

In addition to the tapered bushing mounting arrangement of FIG. 1, where the bushing 22 is mounted flush with the hub face using set screws, many hubs of shaft-mountable structure are designed to accept a tapered bushing that is secured with headed fastening means, such as socket-head cap screws. One example of this mounting arrangement is shown in FIGS. 1 and 2 of U.S. Pat. No. 2,402,743 to Firth, for a Mounting For Sheaves, Etc. The hubs have recessed portions which are designed to accept the heads of the screws when fully installed, thereby providing a flush outer face and permitting the mounting of an additional structure, such as a sheave, adjacent or in close proximity to the first-mounted structure. This type of tapered hub also readily accepts the present adaptor, which then receives a flanged bushing for securing the structure to the shaft. An example of the use of the present invention in this type of hub is shown in FIGS. 3 and 4. Sprocket 114 is mounted on shaft 116 by installing the present adaptor 118 in the hub portion of the sprocket. The recessed portions of the hub, indicated at 120 and 122 in FIG. 4, which are normally designed to accept the heads of cap screws, here serve to accept, and thereby recess, the flange portion of the flanged bushing 124. The recessed portions 120 and 122 also serve as mechanical, axial stops for limiting the axial advancement of the bushing into the hub, and provide abutments against which the flange may exert force as screws 126 are tightened, to draw the adaptor onto the bushing. If a flush outer face is required on both sides of the hub, a flanged bushing having recessed mounting holes can easily be substituted for bushing 124, shown here. If only one side need be flush, the adaptor and bushing may be mounted as shown in FIG. 4, or the bolts or screws may be inserted from the opposite side from that shown, as hereinbefore described.

In the use and operation of the present flanged bushing mounting adaptor, the adaptor 30, or one of the modified forms, is pressed or tapped into the tapered hub of the structure to be mounted on the shaft. The adaptor may have protrusion means, such as bosses 60 or 61, extending outwardly from the outer circumferential surface of the adaptor which correspond to, and are aligned with and inserted into, the half-holes in the tapered hub, which normally accept screws for mounting a conventional tapered bushing 22. Alternatively, the adaptor may have corresponding half-holes which are aligned with the half-holes in the hub, and into which are inserted fastening means, such as set screws, for securing the adaptor in the hub in the same way as the flush-mounted bushing 22 is secured therein. In either case, the bosses or the half-holes act as alignment indicators for orienting the adaptor prior to its insertion, and function as keys during operation for preventing relative rotation between the adaptor and hub. In another form, the adaptor may have neither bosses nor half-holes, depending on the oppositely tapered surfaces of the hub and adaptor to wedge the two into a secure engagement.

The adaptor is installed from one side of the hub, and the flanged bushing is then inserted into the adaptor from the opposite side. The inner circumferential surface of the adaptor is oppositely tapered relative to the tapered body or barrel of the flanged bushing, resulting in a wedged engagement therebetween. Suitable securing means, such as screws or bolts 108 or 126, are then inserted through unthreaded holes in the flange and threaded into threaded bores 100 in the adaptor. As the screws are tightened, the adaptor and bushing are drawn together into the hub. The screws may also be inserted from the opposite direction, first entering unthreaded bores in the adaptor, and then threaded into threaded holes in the flange. To remove the flanged bushing from the adaptor, the screws are removed and threaded into the threaded holes in the flange and against a solid portion of the face of the adaptor to push the bushing out of the adaptor. Alternatively, after the screws are removed, they are threaded through the threaded bores in the adaptor and against a solid portion of the flange to force the bushing out of the adaptor.

The present adaptor, in any of its modified forms, is designed to fit securely in the conventional tapered hub of a shaft-mountable structure. Thus, without the adaptor, the structure may be secured to the shaft with a conventional flush-mounted tapered bushing, or the adaptor may be inserted into the hub to accept a flanged bushing for securing the structure to the shaft. This obviates the need to change the shaft-mountable structure when it is necessary or desirable to mount the structure with a flanged bushing instead of a flush-mount bushing, thereby saving considerable inventory space and down-time of the affected machinery.

While one embodiment and several modifications of a flanged bushing mounting adaptor have been shown and described in detail herein, various other changes and modifications may be made without departing from the scope of the present invention.

We claim:

1. An adaptor for use in mounting a longitudinally split, flanged bushing in the hub of a shaft-mountable element, the bushing having a tapered barrel with a large end and a small end and, at the large end, a radially extending flange with a plurality of threaded holes therein, and the hub having inner walls defining a tapered bore with a large and a small end and with recesses formed in the walls thereof, said adaptor comprising:
   a. a longitudinally split annular member with a tapered body having an outer circumferential surface of a taper substantially the same as the taper of the bore of the hub, for seating in the tapered bore of the hub, and further having a central bore of a taper substantially the same as the bore of said barrel, for receiving the tapered barrel of the bushing, said tapered body having a large and a small end with the large end being larger than the small end of the bore of said hub; and
   b. a plurality of threaded axial bores in the body of said annular member for receiving fastening means extending through the holes in the flange of the bushing and into said threaded bores for pressing the flanged bushing into said annular member to expand said split annular member into firm contact with the inner walls of the bore of said hub and to counteract the bushing onto the shaft on which the element is being mounted;
   c. said central bore and said outer circumferential surface being tapered in opposite directions relative to one another.

2. A flanged bushing mounting adaptor as defined in claim in which said outer circumferential surface includes protrusion means extending outwardly therefrom for engaging the recesses in the hub bore and preventing relative rotation therebetween.

3. A flanged bushing mounting adaptor as defined in claim 2 in which said protrusion means includes at least one semi-circular boss extending axially on said outer circumferential surface.

4. A flanged bushing mounting adaptor as defined in claim 1 in which said annular member has a plurality of unthreaded axial bores corresponding to the threaded holes in the flange, for receiving said fastening means and directing said fastening means to the threaded holes for engagement therewith.

5. A flanged bushing mounting adaptor as defined in claim 1 in which said annular member has a plurality of recesses formed in said outer circumferential surface corresponding to the recesses in the hub bore for receiving securing means for insertion into said corresponding recesses for fastening said adaptor in the hub bore.

6. A flanged bushing mounting adaptor as defined in claim 1 in which said outer circumferential surface has protrusion means extending outwardly therefrom for engaging some of the recesses in the hub bore, and has recesses formed therein corresponding to the other of the recesses in the hub bore for receiving securing means for insertion into said corresponding recesses for fastening said adaptor in the hub bore.

7. An adaptor assembly for use in mounting a longitudinally split, flanged bushing in the hub of a shaft-mountable structure, the bushing having a tapered barrel with a large end and a small end and, at the large end, a radially extending flange with a plurality of threaded and unthreaded holes therein, and the hub having inner walls defining a tapered bore with a large and a small end and with recesses formed in the walls thereof, said adaptor assembly comprising:
   a. a longitudinally split annular member with a tapered body having an outer circumferential surface of a taper substantially the same as the taper of the bore of the hub, and a central bore of a taper substantially the same as the bore of said barrel, for receiving the tapered barrel of the bushing, said tapered body having a large and a small end with the large end being larger than the small end of the bore of said hub;
   b. said central bore and said outer circumferential surface being tapered in opposite directions relative to one another;
   c. a plurality of threaded and unthreaded axial bores in the body of said annular member; and
   d. a plurality of screw-like fastening means extending through the holes in the flange of the bushing and into said threaded bores for pressing the flanged bushing into said annular member to expand said split annular member into firm contact with the inner walls of the bore of said hub and to contract the bushing onto the shaft on which the element is being mounted.

8. A flanged bushing mounting adaptor assembly as defined in claim 7 in which said annular member has protrusion means extending outwardly from said outer circumferential surface for engaging at least one of the recesses in the hub bore and preventing relative rotation therebetween.

9. A flanged bushing mounting adaptor assembly as defined in claim 8 in which said protrusion means includes at least one semi-circular boss extending axially on said outer circumferential surface.

10. A flanged bushing mounting adaptor assembly as defined in claim 7 in which said annular member has a plurality of recesses formed in said outer circumferential surface corresponding to the recesses in the hub, and said adaptor assembly includes securing means for insertion into said corresponding recesses.

11. A flanged bushing mounting adaptor assembly as defined in claim 8 in which said protrusion means includes at least one axially extending, semi-circular boss, and said adaptor assembly includes recesses formed in said outer circumferential surface corresponding with the recesses in the hub bore, and securing means threaded into said corresponding recesses for securing said adaptor in the hub.

12. A flanged bushing mounting adaptor assembly as defined in claim 7 in which said annular member has a plurality of unthreaded axial bores corresponding to the threaded holes in the flange, for receiving said fastening means and directing said fastening means to the threaded holes for engagement therewith.

* * * * *

UNITED STATES PATENT AND TRADEMARK OFFICE
CERTIFICATE OF CORRECTION

PATENT NO. : 4,624,597

DATED : November 25, 1986

INVENTOR(S) : Johnson et al.

It is certified that error appears in the above-identified patent and that said Letters Patent is hereby corrected as shown below:

Column 7, Claim 2, line 46, after "claim" insert --1--.

Signed and Sealed this

First Day of September, 1992

*Attest:*

DOUGLAS B. COMER

*Attesting Officer*  *Acting Commissioner of Patents and Trademarks*